Nov. 4, 1958  F. R. ELDRIDGE, JR  2,858,705
VARIABLE SPEED TRANSMISSION
Filed Aug. 10, 1956  2 Sheets-Sheet 1

INVENTOR.
Frank R. Eldridge, Jr.
BY
W. E. Thibodeau & A. W. Dew
ATTORNEYS.

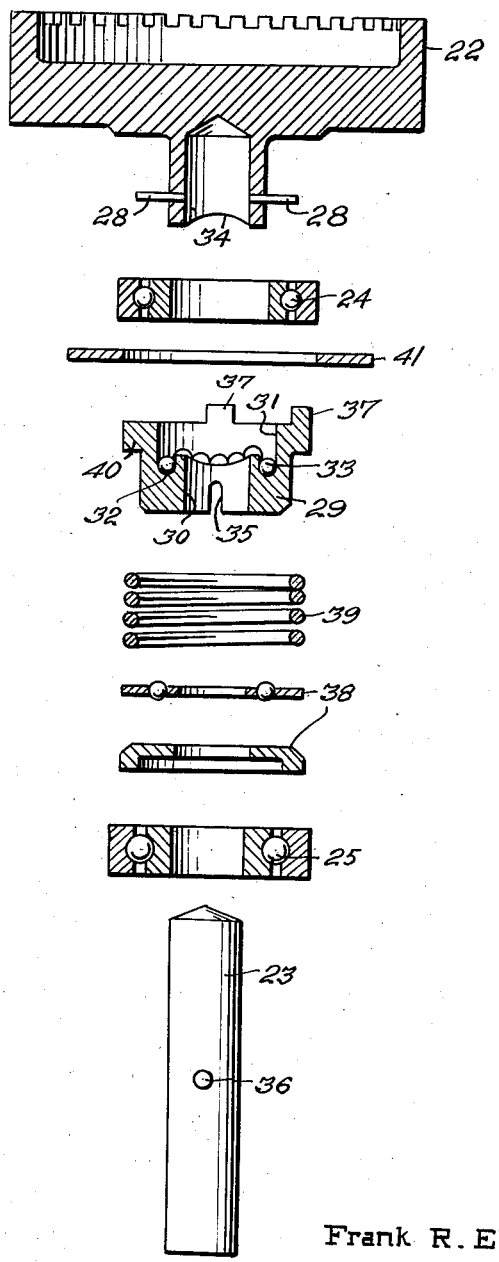

United States Patent Office 2,858,705
Patented Nov. 4, 1958

2,858,705
VARIABLE SPEED TRANSMISSION

Frank R. Eldridge, Jr., Santa Monica, Calif.

Application August 10, 1956, Serial No. 603,464

3 Claims. (Cl. 74—208)

This invention relates to a variable speed transmission, and more particularly to a transmission of the type used in analogue computers and related devices, and employs a ball-disc integrator of the type disclosed in the copending application Serial No. 603,465, filed August 10, 1956, in which the ball force and stall torque are a function of applied output torque.

An object of this invention is to provide a variable speed drive in which the reliability, as measured by percentage slip, is maintained at a constant value over a large range of applied output loads.

Another purpose is to increase the life of the bearing parts of the variable speed transmission by operating at low ball force when the output torque is small.

The specific nature of the invention as well as other objects and advantages thereof, will clearly appear from a description of a preferred embodiment as shown in the accompanying drawings in which:

Fig. 4 is an exploded view of the torque cam coupler assembly.

Figure 1:
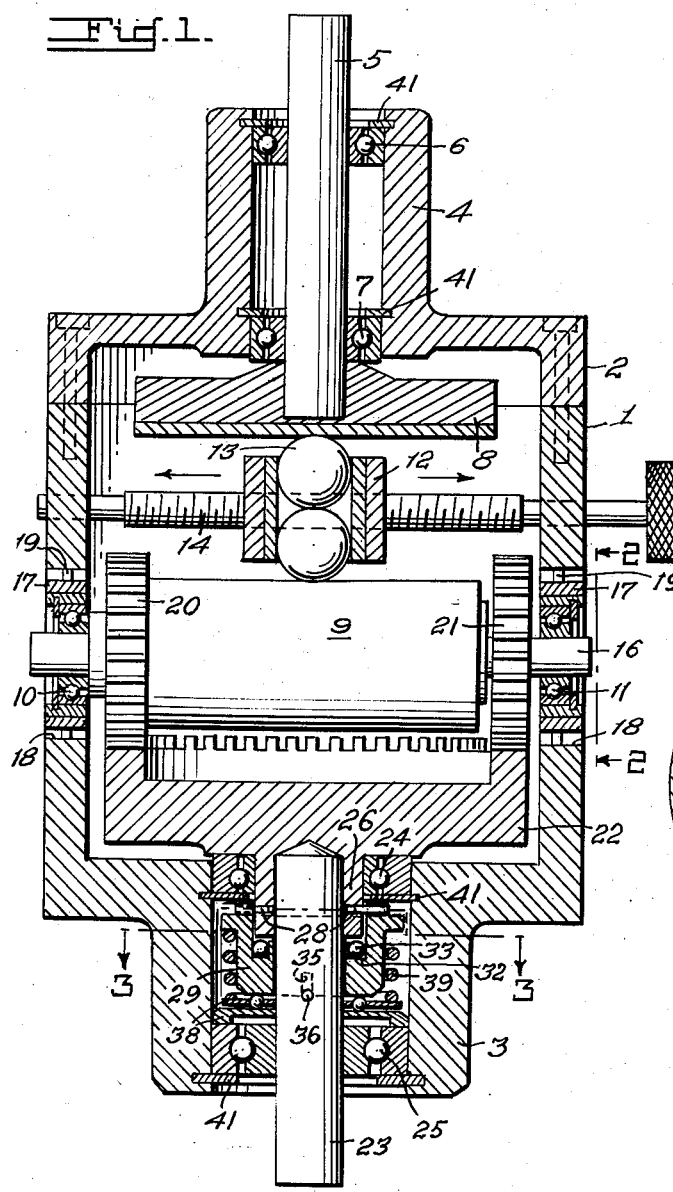
Figure 1 is a cross sectional view taken through a variable speed transmission.
Figure 2:
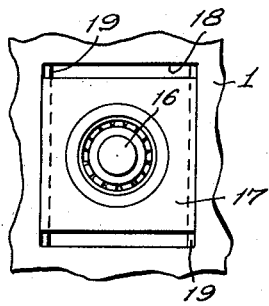
Fig. 2 is a fragmental plan view of one of the slide bearings as viewed from the direction of the arrows 2—2.
Figure 3:
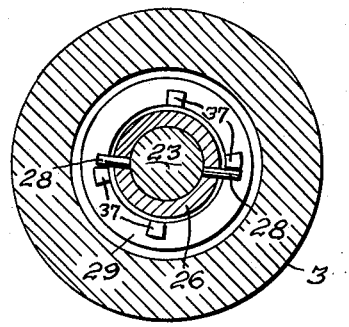
Fig. 3 is a cross sectional view taken along line 3—3 of Fig. 1 and looking in the direction of the arrows.

Referring more particularly to the drawing, wherein like reference characters designate like or corresponding parts throughout the different views, reference character 1 designates a housing having a cover 2. Both housing 1 and cover 2 are provided with axially aligned, reduced, cylindrical extensions 3 and 4 respectively to accommodate mechanism. An input shaft 5 is journaled in extension 4 by radial bearings 6 and 7 and extends into the housing 1 and is press fitted to a disc 8. A roller 9 is transversely journaled below disc 8 in housing 1 by bearings 10 and 11. Mounted between roller 9 and disc 8 is a ball cage 12 containing balls 13. This cage is threadably mounted to a threaded shaft 14 transversely journaled in housing 1 and is adapted to be turned by suitable means such as a knob 15 at one of its ends thereof.

Roller 9 is mounted on a shaft 16, the ends of which are journaled in the bearings 10 and 11. Bearings 10 and 11 are mounted in a pair of sliding blocks 17 sliding in elongated openings 18 in the side walls of housing 1 on a pair of runners 19.

A pair of gears 20 and 21 are mounted on shaft 16, one on each side of roller 9. Gear 20 is fixed to rotate with roller 9, while gear 21 is an idler gear and rotates freely on shaft 6. Gears 20 and 21 mesh with a crown gear 22 rotatably mounted on one end of an output shaft 23 journaled in radial bearings 24 and 25 in extension 3. Crown gear 22 is provided with an annular collar 26 on its under side and receives one end of the output shaft 23. Extending radially from collar 26 is a pair of diametrically opposed pins 28. An annular torque cam coupler 29, having an axial bore 30 is counterbored as at 31 to form an annular chamber, and is mounted on shaft 23. At the bottom of the counterbore 31 there is formed a groove having an undulated bottom 32, adapted to receive a series of ball bearings 33 nesting therein. Torque cam coupler 29 is mounted on shaft 23 so that the ball bearings 33 bear against the under annular surface 34 of the boss 26 of crown gear 22 which is undulated and is in juxtaposition to surface 32. To limit downward movement of torque cam coupler 29, there is provided a pair of diametrically disposed slots 35 receiving a diametrically disposed pin 36 piercing shaft 23.

The upper surface of torque cam coupler 29 is provided with a series of stops 37 to limit the relative rotation of the torque cam coupler 29 to 90° about collar 26. A thrust bearing assembly 38 is mounted between torque cam coupler 29 and radial bearings 25 to receive the thrust of torque cam coupler 29 thereon. A coil spring 39 is interposed between an annular flange 40 integral to the upper edge of torque cam coupler 29 and thrust bearing assembly 38. Suitable retaining rings 41 are provided to retain bearings 6, 7, 24 and 25 in extensions 4 and 3 respectively. Bearings 6 and 7 are press fitted on shaft 5 and disc 8 is press fitted on shaft 5. Bearing 24 is press fitted on cylindrical boss 26 and bearings 25 are press fitted on shaft 23, while crown gear 22 is free to rotate on shaft 23. Hence both shaft assemblies will be held against axial dislodgement by this arrangement.

In operation, disc 8 is driven by input shaft 5 at a constant speed. Roller 9 may be driven at variable speeds. The speed of roller 9 is varied by turning knob 15 which will move ball cage 12 longitudinally of the axis of roller 9 and diametrically of disc 8. As roller 9 rotates, gear 20, being fixed to roller 9 on shaft 16 will rotate and turn crown gear 22 to rotate output shaft 23 through pins 28 and stops 37.

When a torque load is applied to shaft 23, torque cam coupler 29 will tend to rotate with respect to cam surface 26 forcing the gear 22 in an upward direction and applying a greater ball force to the integrator balls 13. The rotation of the torque cam coupler 29 will be limited to 90° due to pins 28 bearing against stops 37. This in turn limits the upward displacement of gear 22 with respect to torque cam coupler 29 hence limiting the ball force to a value which will not damage the mechanism. The torque cam coupler will be biased upwardly at all times due to spring 39.

Friction is kept at a minimum between cam surfaces 26 and 32 due to ball bearings 33 and the thrust bearing assembly 38.

It is apparent from the foregoing, that a highly efficient variable speed transmission has been devised capable of long life and simple in construction.

Various modifications and changes are contemplated and may obviously be resorted to without departing from the spirit and scope of the invention as hereinafter defined by the appended claims as only a preferred embodiment thereof has been disclosed.

I claim:

1. In a variable speed transmission including a housing, a cover for said housing, an input shaft journaled for rotation in said cover, an output shaft journaled in said housing, said shafts being in co-axially aligned relation, transmission means between said input shaft and said output shaft comprising a disc fixed to the inner end of said input shaft, a shaft journaled in spaced relation from said disc in a pair of sliding bearings in said housing, said shaft being at right angles to and having its axis intersecting the axis of said input shaft, a roller mounted for rotation about said shaft, a first pinion fixed for rotation with said roller at one end thereof, a second idler pinion mounted on said shaft adjacent the other end of said roller, an adjustable transmission means for varying the speed of said roller disposed between said roller and said disc comprising a threaded shaft journaled for rotation in said housing having its axis parallel to the axis of said roller, a ball cage threadably engaged on said threaded shaft, a pair of axially aligned balls carried by said ball cage, said balls normally contacting said disc and said roller and disposed to travel diametrically of said disc and longitudinally along said roller, transmission means between said roller and said output shaft comprising a crown gear carried by the inner end of said output shaft, said crown gear meshing with said pinions, said crown gear defining an annular collar portion along its outer end thereof, its outer edge being undulated, means for applying ball force upon said balls comprising an annular cam coupler slidably mounted on said output shaft provided with an undulated surface in juxtaposition to said undulations on said collar on said crown gear, spring means biasing said cam coupler towards said collar and means carried by said cam coupler and said collar cooperating to limit rotation of said cam coupler about said collar.

2. In a variable speed transmission, the combination with a two-ball integrator including a housing provided with a first tubular extension at one end thereof, and a second tubular extension at the other end and in coaxial alignment with said first tubular extension, an input shaft journaled for rotation in said first extension, a disc mounted to said input shaft within said housing, an intermediate shaft mounted in a pair of sliding bearings in said housing, a roller mounted for rotation on said shaft, a first pinion fixed to one end of said roller for rotation therewith, a second pinion mounted for free rotation on said shaft adjacent the other end of said roller, a threaded shaft journaled for rotation in said housing between said input shaft and intermediate shaft and parallel to said roller, a ball cage threadably mounted on said threaded shaft for translatory motion thereon, and diametrically of said disc, a pair of axially aligned ball bearings supported by said ball cage normally contacting said roller and said disc, a crown gear meshing with said pinions and defining at one end thereof an annular collar, said collar having an undulated cam surface along its outer edge, an annular torque responsive cam coupler slidably mounted on said output shaft and defining an annular chamber therein encircling said collar and having an annular groove formed along its bottom thereof, said groove being undulated along its bottom surface, said undulations in said groove and on said collar being in juxtaposed relation, a series of anti-friction ball bearings carried in said groove, and means limiting rotation of said cam coupler through an arc of 90° about said output collar comprising a series of upstanding stops integral to one surface of said cam coupler adapted to bear against a pair of radially extending, diametrically opposed pins carried by said collar.

3. In a variable speed transmission as claimed in claim 2 wherein said torque responsive cam coupler is provided with means limiting outward movement along said output shaft and rotation thereabout, said means comprising a diametrically disposed pin in said output shaft adapted to ride in a pair of diametrically disposed slots cut in the side wall of said cam coupler.

References Cited in the file of this patent

UNITED STATES PATENTS

| | | |
|---|---|---|
| 1,401,505 | Sykora | Dec. 27, 1921 |
| 2,660,897 | Neidhart et al. | Dec. 1, 1953 |